United States Patent [19]

Easter

[11] Patent Number: 5,501,061

[45] Date of Patent: Mar. 26, 1996

[54] METHOD AND APPARATUS FOR CLEARING EXCESS BEVERAGE CONTAINERS FROM A BEVERAGE CONTAINER PACKAGING MACHINE

[75] Inventor: William M. Easter, Roswell, Ga.

[73] Assignee: Riverwood International Corporation, Atlanta, Ga.

[21] Appl. No.: 260,847

[22] Filed: Jun. 16, 1994

[51] Int. Cl.⁶ ........................................ B65B 21/06
[52] U.S. Cl. .................... 53/443; 53/251; 53/475; 53/534; 53/543; 198/428; 198/493
[58] Field of Search ........................ 198/428, 493; 53/48.1, 251, 252, 393, 443, 448, 458, 475, 534, 543, 566

[56] References Cited

U.S. PATENT DOCUMENTS

| | | | |
|---|---|---|---|
| 3,329,469 | 7/1967 | Stadelman | 198/493 |
| 3,603,645 | 9/1971 | Hardy | 198/493 |
| 4,042,099 | 8/1977 | Sterling | 198/493 X |
| 4,773,524 | 9/1988 | Greeves | 198/428 |
| 4,982,551 | 1/1991 | Nigrelli | 53/251 X |
| 5,248,045 | 9/1993 | Alvelda | 198/493 X |
| 5,311,979 | 5/1994 | Risley et al. | 198/493 X |

Primary Examiner—W. Donald Bray
Assistant Examiner—Daniel Moon

[57] ABSTRACT

A method is disclosed for clearing excess trailing beverage containers from the lanes defined between guide rails in a beverage container packaging machine. The method includes providing the guide rails with compressed air nozzles that are positioned and oriented to direct compressed air along the lanes defined between the guide rails in the desired direction of movement of beverage containers along the lanes. An apparatus that includes an improved guide rail configured to achieve the method of the invention is also provided.

20 Claims, 3 Drawing Sheets

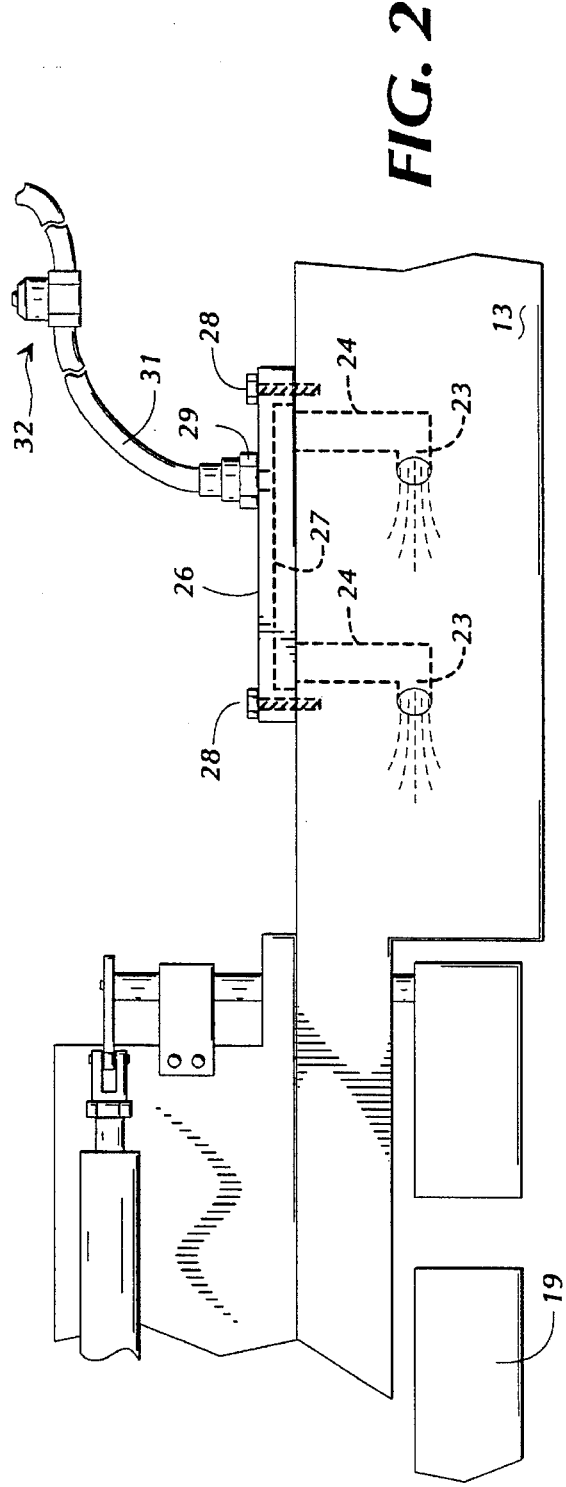
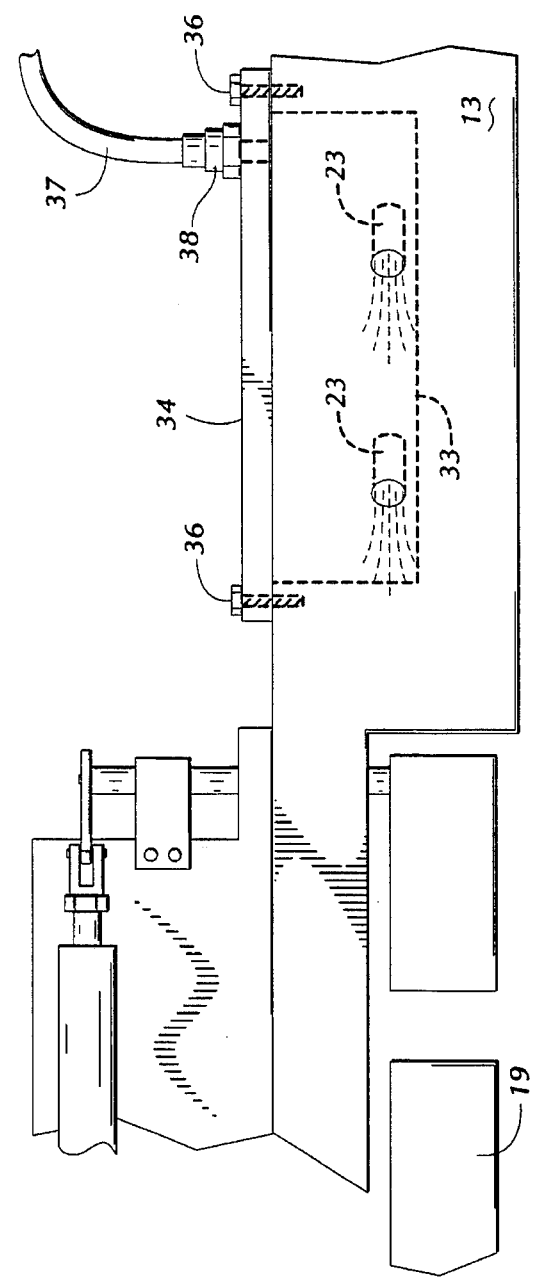

METHOD AND APPARATUS FOR CLEARING EXCESS BEVERAGE CONTAINERS FROM A BEVERAGE CONTAINER PACKAGING MACHINE

TECHNICAL FIELD

This invention relates generally to beverage container packaging machines in which beverage containers such as cans or bottles are packed into cartons for retail sale. More particularly, the present invention addresses the problem of clearing excess trailing beverage containers from such packaging machines at the end of a packaging operation.

BACKGROUND OF THE INVENTION

This invention relates to beverage packaging machines of the type disclosed in pending U.S. patent application Ser. No. 08/118,111, the specification of which is incorporated herein by reference for purposes of providing background information. In general, such machines include a plurality of spaced guide rails that form a plurality of lanes. Beverage containers to be packaged are moved into the lanes and herded thereby toward a packaging mechanism of the machine, where the containers are grouped by moving spaced selector wedges and inserted into waiting cartons. While the specific operating details of such machines can vary greatly, most such machines includes these guide rails, lanes, and selector wedges for herding, directing, and grouping the beverage containers.

In one specific type of beverage container packaging machine, containers such as cans or bottles are moved along in mass on a wide conveyer belt until they encounter the ends of an array of spaced guide rails forming lanes for the containers. The containers enter the lanes, which herd the containers laterally relative to the conveyor toward a packaging mechanism located to the side of the conveyor. As the containers are herded off of the edge of the conveyor, they move, still in the lanes, onto a fixed or possibly a moving surface across which they continue to move until they engage a set of moving selector wedges, which group the containers for subsequent insertion into cartons.

The selector wedges have angled ends that engage the cans in the lanes and progressively part them into appropriate sized groups. During normal operation of the packaging machine, containers that move off of the conveyor and onto the fixed or moving surface continue to be pushed along within their lanes by the force of the many containers still on the conveyor behind them. This force presses the leading containers positively and firmly against the ends of the selector wedges, which is a necessary condition for proper operation of the wedges. In this way, containers are naturally compacted and held firmly against the selector wedges, which capture the containers, part them, and physically move them along within their lanes until they are inserted into their respective cartons.

Such beverage container packaging machines tend to exhibit a problem at the end of a packaging operation when the last of the beverage containers move through the lanes defined by the spaced guide rails. Specifically, as the last of the containers move through the lanes and off of the conveyor, fewer and fewer containers remain on the conveyor. Eventually, the force of the few trailing containers still on the conveyor is insufficient to push and hold the leading containers firmly against the selector wedges. As a result, the last few containers are not picked up by the selector wedges and so become stuck in their lanes in the region between the conveyor and the selector wedges. These containers must be removed prior to a subsequent packaging operation.

In most instances, the particular region of the machine in which the containers become stuck is not easily accessible since it is surrounded by other operational elements of the machine. Accordingly, manual clearing of the excess beverage cans usually is a major undertaking, requiring substantial time and the efforts of one or more highly paid operators. In many cases, it has been necessary to remove elements of the packaging machine itself to gain access to the stuck containers for manual removal.

Clearly, there exists a continuing and heretofore unaddressed need for an efficient method of clearing excess beverage containers from a beverage container packaging machine at the end of a packaging operation. Such a method should be quick, require a minimum of effort on the part of machine operators, and should function reliably without removal of machine elements or insertion into the machine of auxiliary clearing apparatuses. It is to the provision of such a method that the present invention is primarily directed.

SUMMARY OF THE INVENTION

Briefly described, the present invention, in a preferred embodiment thereof, comprises an improved method and apparatus for clearing excess trailing beverage containers from a beverage container packaging machine at the end of a packaging operation. This invention is particularly applicable to a beverage container packaging machine wherein the guide rails that form the lanes of the machine extend at an angle from the region of the conveyor, off the edge of the conveyor, and across a fixed or moving plate toward the selector wedge grouping mechanism of the machine. As discussed above, this is the type of machine in which excess trailing containers are not held firmly against the selector wedges and thus tend to become stuck between the edge of the conveyor and the grouping mechanism. It should be understood, however, that the invention described and claimed herein is not limited to a specific packaging machine or, for that matter, is it limited to packaging machines at all since it has application to any type of machine in which articles require clearing from lanes.

According to the invention, the guide rails of a beverage container packaging machine are provided with compressed air nozzles that are positioned and angled to direct jets of compressed air down the lanes between the guide rails toward the selector wedge grouping mechanism. The nozzles are incorporated into the guide rails in the region of the machine spanning the edge of the moving conveyor and the selector wedge grouping mechanism. A manifold and compressed air coupling is provided to allow compressed air to be forced at the option of an operator through the nozzles and down the lanes.

The present invention is normally actuated at the end of a packaging operation when the last few trailing containers are progressing through the lanes of the machine. As the containers begin to become stuck in the region between the conveyor and the selector wedge grouping mechanism, an appropriate solenoid valve is actuated automatically to issue compressed air into the manifold and through the angled nozzles. The force of the compressed air bears on the remaining containers within the lanes and substitutes for the force normally provided during the packaging operation by the large number of trailing containers still on the conveyor. As a result, the few excess trailing containers are urged by the compressed air along their lanes, across the fixed or moving plate, and into firm engagement with the selector wedges of the grouping mechanism, which then move the containers on out of the machine. When all excess containers are thus cleared from the machine, the compressed air is discontinued and the next packaging operation can be commenced.

It can thus be seen that the present invention embodies an improved method and apparatus for clearing excess beverage containers from a beverage container packaging machine that successfully addresses the problems and shortcomings of the prior art. Specifically, the present invention functions quickly, efficiently, and reliably to clear the last few trailing containers from the machine following a packaging operation. Further, the invention functions with a bare minimum of operator intervention and does not require that auxiliary clearing devices be inserted into the machine. In addition, the present invention clears the packaging machine while it continues to operate and requires no shut down or removal of components as has been necessary in the prior art. These and additional features, objects, and advantages of the present invention will become more obvious upon review of the detailed description set forth below taken in conjunction with the accompanying drawings, which are briefly described as follows.

BRIEF DESCRIPTION OF THE DRAWINGS

FIG. 2 is a side elevational view of a section of a guide rail in a beverage container packaging machine illustrating a preferred method of machining the guide rail to implement the method of this invention.

FIG. 3 is a side elevational view of a section of a guide rail in a beverage container packaging machine illustrating an alternative method of machining the guide rail to implement the method of this invention.

DETAILED DESCRIPTION OF THE PREFERRED EMBODIMENT

Figure 1:
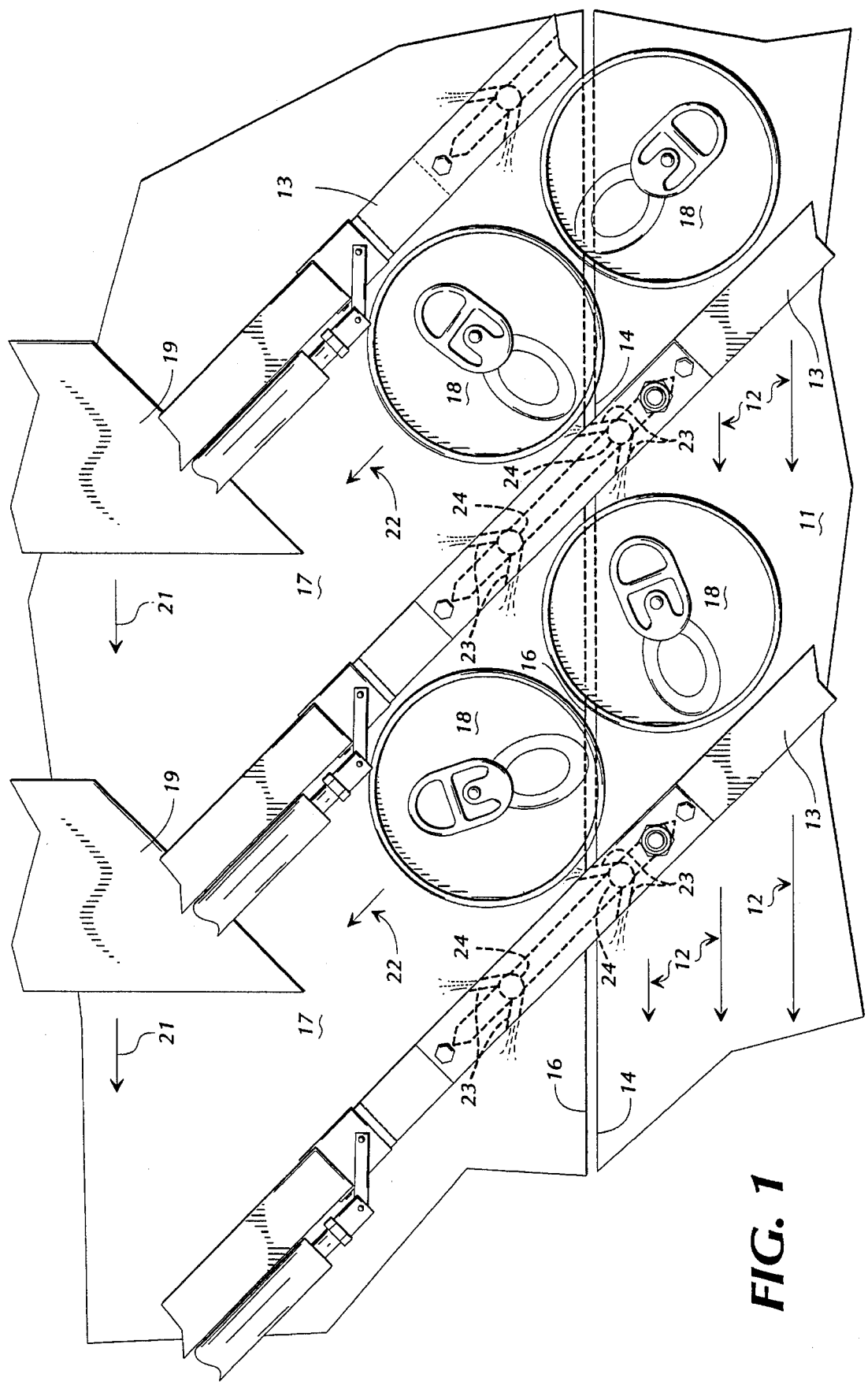
FIG. 1 is a top plan view showing a portion of a beverage container packaging machine that embodies principals of the present invention in a preferred form and illustrating operation of the invention.

Referring now in more detail to the drawings, in which like numerals refer to like parts throughout the several views, FIG. 1 illustrates a preferred implementation of the present invention in a beverage container packaging machine. The detail operation of such a packaging machine is discussed in the U.S. patent application identified above. In general, the machine comprises a moving conveyor belt 11 that is driven so that its surface moves in the direction indicated by arrows 12. The conveyor 11 has an edge portion 14 that is disposed along and adjacent to the edge portion 16 of a fixed or moving surface 17.

An array of spaced guide rails 13 are oriented at an angle over the surface of the conveyor 11 and extend across the edge 14 thereof and across the surface 17. The purpose of the guide rails 13 is to align beverage containers 18 and herd them along the lanes defined between the guide rails progressively off of the conveyor 11 and toward the grouping and packaging section of the packaging machine. The grouping and packaging section of the machine includes a plurality of spaced selector wedges 19 that are moved along in synchronization with the conveyor 11 in the direction indicated by arrows 21. While the detailed functioning of the selector wedges and packaging portion of the machine is not critical to the present invention, it will be understood by those of skill in the art that the wedges 19 in conjunction with the guide rails 13 and other components of the packaging machine function to group beverage containers 18 together in appropriate configurations for insertion into waiting open cartons. As the beverage containers engage and bear against the angled ends of the selector wedges, the wedges spread the containers apart at appropriate locations to form groups of containers that then move on to be inserted into cartons. It is important for proper operation of the selector wedges that the containers bear firmly against them during the grouping process.

It will be understood from FIG. 1 that when a beverage container 18 is within a lane defined between two guide rails and is on the conveyor 11, the friction between the conveyor surface and the beverage container causes the container to move along the lane in the direction indicated by arrow 22. However, when the container moves off of the conveyor 11 and onto the surface 17, friction between the container and the moving conveyor no longer is sufficient to assure a firm engagement between the container and the end of the selector wedge. Nevertheless, during normal operation of the machine, a relatively large number of containers remain in the lane behind the container that has moved off of the conveyor. The combined friction between the conveyor and these cans provides sufficient force to push the leading container in the lane on across the surface 17 until it is in positive firm engagement with a selector wedge 19, which then groups and moves the containers on through the machine for packaging into cartons.

A different situation exists, however, at the end of a particular packaging operation, as the containers 18 within the lanes dwindle in number. At some point, the situation illustrated in FIG. 1 exists where there is only one or maybe two containers remaining on the conveyor 11 behind the leading container that is on the surface 17. Under these circumstances, the force imparted to the containers on the conveyor is not sufficient to push the leading container across the surface 17 and hold it firmly against a selector wedge 19. As a result, the selector wedges are not able to function properly to group the trailing containers and move them on through the machine. The two or three trailing containers in each lane thus become stuck in the machine and must be moved or urged along the lanes manually until they are engaged by the selector wedges 19. Unfortunately, as discussed in the background section above, this particular section of most packaging machines is not readily accessible and, in the past, significant effort has been required to move or remove the containers that become stuck in the machine.

According to the present invention, each of the guide rails 13 is provided with a set of compressed air nozzles 23. In the illustrated embodiment, each of the nozzles 23 is formed by a hole or passageway machined in the body of the guide rail. The passageway extends from the side surface of the guide rail in an upstream direction back toward the conveyor 11. With the compressed air nozzles configured in this way, compressed air forced through the nozzles causes a jet of compressed air to be directed along the lane in a down stream direction toward the selector wedges of the machine. These jets of compressed air impinge upon beverage containers 18 in the region of edge of the conveyor and the surface 17 with sufficient force to move these containers along the lane until they engage and are held firmly against the selector wedges 19. With the containers held firmly against the wedges by the force of the air, the wedges are able to function properly to part and group the containers and move them on through the machine. The lanes are thus cleared of excess trailing containers.

In the illustrated embodiment, each of the guide rails 13 is provided with a set of four nozzles 23. The nozzles are positioned on the guide rail to issue jets of compressed air that impinge upon containers 18 as they leave the conveyor 11 and again as they move along the surface 17. It has been found that such an arrangement of nozzles provides sufficient force to move the containers from the conveyor 11, across the surface 17, and hold them in firm contact with the selector wedges 19. Thus, the excess trailing containers at the end of a packaging operation do not become stuck in the machine but rather are moved along their respective lanes and engaged by the moving selector wedges 19 just as all of the other containers that are processed during the packaging operation. In conjunction with this, stops can be provided in the lanes to ensure that just the proper number of excess trailing containers are available to result in full carton packages when these excess containers completely clear the machine. Accordingly, the present invention contributes to efficiency by reducing the waste previously associated with simply clearing out the stuck containers and throwing them away.

A variety of methods of providing the nozzles 23 with compressed air to create the necessary jets might be employed. FIGS. 2 and 3 illustrate two such methods. However, it will be understood by those of skill in the art, that providing the necessary compressed air could be accomplished in a variety of ways and that the present invention is not limited to any particular supply configuration.

In FIG. 2, the passageways that form the nozzles 23 are drilled or otherwise machined in the guide rail 13 at an appropriate angle as illustrated in FIG. 1. Supply passageways 24 are then machined vertically through the top edge of the guide rail 13 until they intersect within the guide rail with the passageways that form the nozzles 23. Thus, compressed air provided to the supply passageways 24 is directed to the nozzles 23 and issues therefrom in jets of compressed air. A manifold 26 having an interior cavity 27 machined therein is fixed and sealed to the top edge of the guide rail 13 by appropriate fasteners 28. The manifold 26 is located on the guide rail such that its cavity 27 covers the openings of the supply passageways 24 drilled into the guide rail. A compressed air coupler 29 and compressed air line 31 connects the manifold 26 to a source of compressed air (not shown). A solenoid valve 32 is preferably installed in the compressed air line 31 so that compressed air can be provided from its source selectively to the manifold 26 and nozzles 23 by appropriate actuation of the solenoid valve 32. In this way, the jets of compressed air for moving the excess trailing containers along the lanes can be issued only when necessary through activation of the solenoid valve 32.

FIG. 3 illustrates an alternate method of supplying compressed air to the nozzles 23. In this embodiment, the nozzles 23 are again formed by passageways that are drilled or otherwise machined at an angle into the guide rail 13. A slot 33 is machined through the top edge of the guide rail to a sufficient depth to intersect the nozzle passageways 23. A plate 34 is mounted and sealed to the top edge of the guide rail 13 by appropriate fasteners 36 and, as with FIG. 2, compressed air can be supplied through the plate 34 and to the slot 33 by a compressed air line 37 and compressed air coupler 38. When compressed air is provided to the cavity formed by the slot 33 and the plate 34, it is directed through the nozzles 23 to move the cans along adjacent lanes. An advantage of this configuration is that supply passageways requiring high machining precision are not required. Further, if necessary, additional passageways forming additional nozzles can be machined into the guide rail 13 without the necessity of machining additional supply passageways in the rail. Also, as with the previous embodiment, incorporating the nozzles into the rails insures that when the rails are adjusted to accommodate a different size beverage container, the nozzles are also adjusted automatically.

Figure 4:
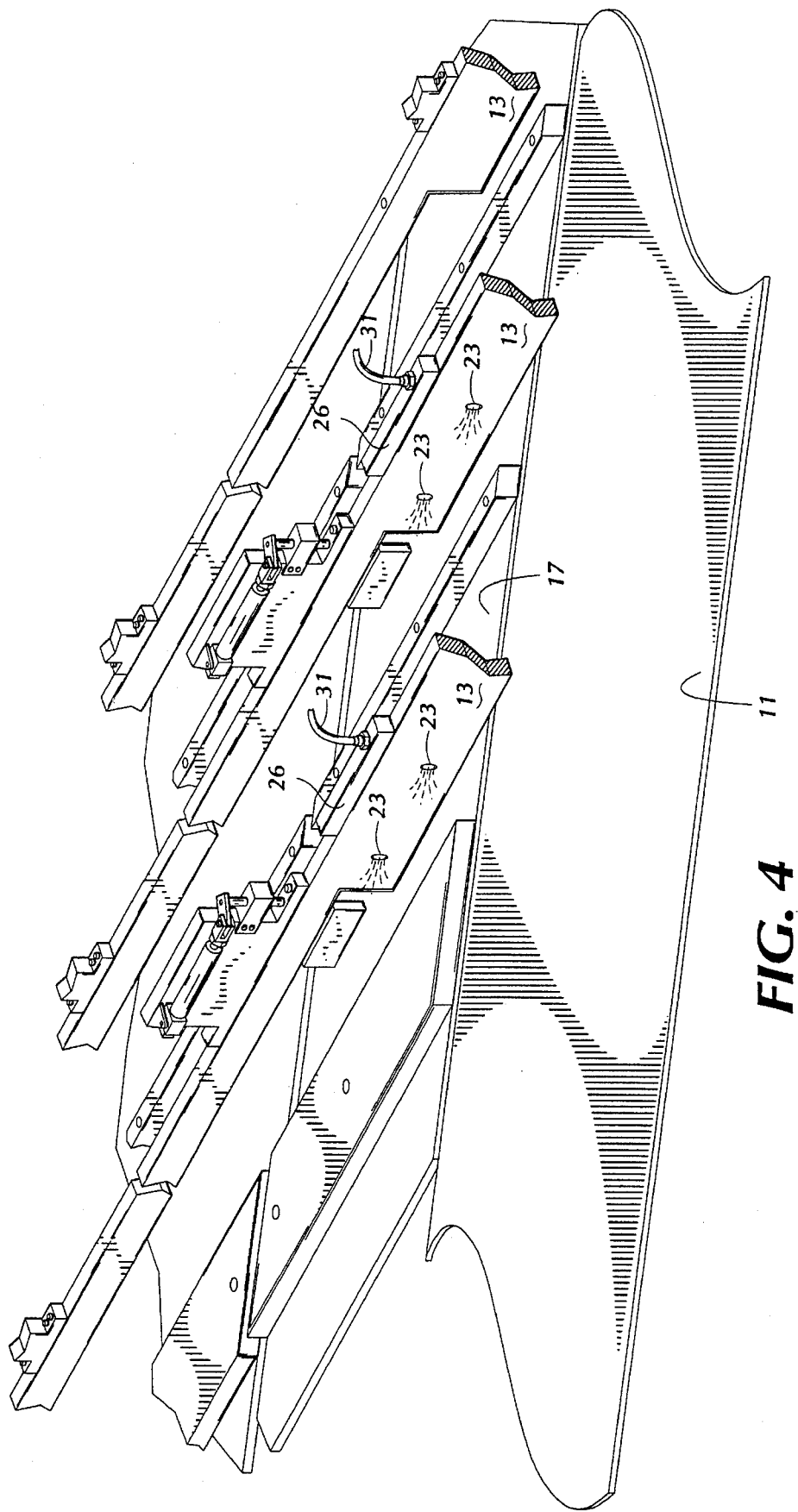
FIG. 4 is a perspective partially sectioned view showing implementation of the method of this invention on a particular type of beverage container packaging machine.

FIG. 4 illustrates the present invention in perspective form shown installed on a beverage container packaging machine of a particular construction. The nozzles 23 are seen to be located on the sides of the guide rails 13 with manifolds 26 and supply lines 31 positioned on the top edges of the guide rails. It can be seen clearly from FIG. 4 that jets of compressed air issuing from the nozzles 23 move or urge excess trailing beverage containers along the lanes formed by the guide rails 13 generally to the left in FIG. 4, where they are packaged into cartons in the normal way.

The invention has been described herein in terms of preferred embodiments and methodologies. It will be obvious to those of skill in this art, however, that various modifications might well be made to the illustrated embodiments without departing from the scope of the present invention. For example, numerous nozzle configurations might well be employed and the angled passageway configuration shown in the preferred embodiments should not be considered a limitation of this invention. Further, various other methods of providing compressed air to the nozzles might well be used. Finally, it should be understood that this invention is not specifically limited to beverage container packaging machines but is useful in any application where articles are moved along lanes formed by dividers or guide rails. These and many other additions, deletions, and modifications might well be made to the embodiments illustrated herein without departing from the spirit and scope of the invention as set forth in the claims.

I claim:

1. For implementation in a beverage container packaging machine wherein an array of spaced guide rails form lanes along which beverage containers are moved during the packaging process, a method of clearing excess trailing beverage containers from the machine at the end of a packaging operation, said method comprising the steps of:

(a) providing the guide rails with a set of compressed air nozzles coupled to a source of compressed air with the nozzles being positioned and oriented on the guide rails to direct a jet of compressed air along the lanes defined between the guide rails substantially in the direction of movement of beverage containers along the lanes;

(b) actuating the nozzles to direct a jet of compressed air along the lanes to clear excess trailing beverage containers from the lanes of the beverage packaging machine; and (c) discontinuing the jet of compressed air when the excess trailing beverages have been cleared from the lanes by the force of the compressed air;

wherein said step of providing the guide rails with compressed air nozzles comprises the step of placing said compressed air nozzles in a transitional region of a moving conveyor and a stationary surface, said jet of compressed air forcing said beverage containers across said stationary surface away from said conveyor.

2. The method of claim 1 and wherein step (b) comprises actuating a valve to provide compressed air to the set of compressed air nozzles.

3. The method of claim 1 and wherein step (a) comprises machining a set of passageways in the guide rails with the passageways being angled to issue jets of compressed air along the lanes defined by the guide rails.

4. The method of claim 3 and wherein step (a) further comprises machining a channel in the guide rails with the channel intersecting and communicating with the set of passageways and capping the channel on the top of the rail.

5. The method of claim 3 and wherein step (a) further comprises drilling a set of supply passageways through the top of the guide rails with the supply passageways being positioned to intersect with the passageways forming the nozzles and covering the passageways in the top of the guide rail with a compressed air manifold coupled to a source of compressed air.

6. The method of claim 1, wherein said step of actuating the nozzles occurs only at said end of said packaging operation.

7. In a beverage container packaging machine wherein an array of spaced guide rails form lanes along which beverage containers move during the packaging process, an apparatus for urging the beverage containers along the lanes defined between said guide rails, said apparatus comprising:

nozzle means on at least one of said guide rails with said nozzle means being positioned and oriented to direct compressed air issuing from said nozzle means along a lane adjacent to said guide rail in the direction of movement of beverage containers along the lane;

a source of compressed air;

coupling means on said guide rail for coupling said nozzle means to said source of compressed air; and valve means for selectively providing compressed air from said source of compressed air to said coupling means only at an end of said packaging process for directing a jet of said compressed air through said nozzle means and along a lane adjacent to said guide rail to urge excess beverage containers within the lane to move along the lane substantially in the direction of the compressed air jet.

8. An apparatus for urging beverage containers along the lanes defined between guide rails in a beverage packaging machine as claimed in claim 7 and wherein said guide rails have sides and a predetermined thickness and wherein said nozzle means comprises at least one nozzle passageway formed in a side of said guide rail with said nozzle passageway extending into said guide rail at a predetermined angle to direct compressed air issuing from said nozzle passageway along the lane adjacent to said guide rail in the direction of movement of beverage containers along the lane.

9. An apparatus for urging beverage containers along the lanes defined between guide rails in a beverage packaging machine as claimed in claim 8 and wherein said guide rail has a top edge and wherein said coupling means comprises a supply passageway formed in said guide rail and extending from the top edge thereof into said guide rail to intersect within said guide rail with said nozzle passageway and means for providing compressed air from said source of compressed air to said supply passageway at the top edge of said guide rail.

10. An apparatus for urging beverage containers along the lanes defined between guide rails in a beverage packaging machine as claimed in claim 9 and wherein said means for providing compressed air from said source of compressed air to said supply passageway comprises a manifold mounted and sealed to said top edge of said guide rail covering said supply passageway and means for supplying compressed air from said source of compressed air to said manifold.

11. An apparatus for urging beverage containers along the lanes defined between guide rails in a beverage packaging machine as claimed in claim 8 and wherein said guide rail has a top edge and wherein said coupling means comprises a channel formed in said guide rail extending from the top edge thereof into said guide rail to intersect within said guide rail with said nozzle passageway and means for providing compressed air from said source of compressed air to said channel at the top edge of said guide rail.

12. An apparatus for urging beverage containers along the lanes defined between guide rails in a beverage packaging machine as claimed in claim 11 and wherein said means for providing compressed air to said channel comprises a cover plate mounted and sealed to said top edge of said guide rail covering said channel and means for supplying compressed air from said source of compressed air through said cover plate and to said channel.

13. The apparatus of claim 7, wherein said valve means provides compressed air from said source of compressed air to said coupling means only at an end of said packaging process.

14. The apparatus of claim 7, wherein said nozzle means is positioned in a transitional region of a moving conveyor belt and a stationary surface so that said compressed air jet forces said beverage containers across said stationary surface.

15. A guide rail for use in a beverage packaging machine wherein an array of spaced guide rails form lanes for herding beverage cans in desired directions in said beverage packaging machine, said guide rail being formed as an elongated strip having opposed sides and a predetermined thickness and being provided with nozzle means on at least one of said opposed sides, said nozzle means being positioned and oriented to direct compressed air issuing from said nozzle means along a lane adjacent to said guide rail in the direction of movement of beverage containers along the lane to urge only an excess number of beverage containers along the lane in the desired direction, said compressed air for forcing said beverage containers across a stationary surface.

16. The guide rail of claim 15 and wherein said nozzle means comprises a passageway formed in said guide rail with said passageway terminating in an orifice on the side of said guide rail and extending from said orifice at an angle into said guide rail to direct compressed air from said orifice along the lane adjacent to said guide rail.

17. The guide rail of claim 15 and wherein at least one of said nozzle means is provided on each of the opposed sides of said guide rail to direct compressed air along the lanes defined on either side of said guide rail.

18. The guide rail of claim 15, wherein said nozzle means is positioned in a transitional region of a moving conveyor and said stationary surface so that said compressed air issued from said nozzle means forces said beverage containers across said stationary surface and away from said conveyor.

19. For implementation in a beverage container packaging machine wherein an array of spaced guide rails form lanes along which beverage containers are moved during the packaging process, a method of clearing excess trailing beverage containers from the machine at the end of a packaging operation, said method comprising the steps of:

(a) providing the guide rails with a set of compressed air nozzles coupled to a source of compressed air with the nozzles being positioned and oriented on the guide rails to direct a jet of compressed air along the lanes defined between the guide rails substantially in the direction of movement of beverage containers along the lanes;

(b) actuating the nozzles only at said end of said packaging operation to direct a jet of compressed air along the lanes to clear excess trailing beverage containers from the lanes of the beverage packaging machine; and (c) discontinuing the jet of compressed air when the excess trailing beverages have been cleared from the lanes by the force of the compressed air.

20. In a beverage container packaging machine wherein an array of spaced guide rails form lanes along which beverage containers move during the packaging process, an apparatus for urging the beverage containers along the lanes defined between said guide rails, said apparatus comprising:

nozzle means on at least one of said guide rails with said nozzle means being positioned and oriented to direct compressed air issuing from said nozzle means along a lane adjacent to said guide rail in the direction of movement of beverage containers along the lane;

a source of compressed air;

coupling means on said guide rail for coupling said nozzle means to said source of compressed air; and valve means for selectively providing compressed air from said source of compressed air to said coupling means for directing a jet of said compressed air through said nozzle means and along a lane adjacent to said guide rail to urge excess beverage containers within the lane to move along the lane substantially in the direction of the compressed air jet;

wherein said nozzle means is positioned in a transitional region of a stationary surface and a moving conveyor and said compressed air is for forcing said beverage containers across said stationary surface and away from said conveyor.

* * * * *